United States Patent
Eshel-Goldman et al.

(10) Patent No.: US 9,639,362 B2
(45) Date of Patent: May 2, 2017

(54) INTEGRATED CIRCUIT DEVICE AND METHODS OF PERFORMING BIT MANIPULATION THEREFOR

(75) Inventors: Noam Eshel-Goldman, Tel Aviv (IL); Aviram Amir, Petach-Tikva (IL); Itzhak Barak, Kadima (IL); Amir Kleen, Hertzelia (IL)

(73) Assignee: NXP USA, INC., Austin, TX (US)

( * ) Notice: Subject to any disclaimer, the term of this patent is extended or adjusted under 35 U.S.C. 154(b) by 425 days.

(21) Appl. No.: 14/005,475

(22) PCT Filed: Mar. 30, 2011

(86) PCT No.: PCT/IB2011/051353
§ 371 (c)(1),
(2), (4) Date: Sep. 16, 2013

(87) PCT Pub. No.: WO2012/131433
PCT Pub. Date: Oct. 4, 2012

(65) Prior Publication Data
US 2014/0013088 A1    Jan. 9, 2014

(51) Int. Cl.
*G06F 9/02* (2006.01)
*G06F 9/30* (2006.01)

(52) U.S. Cl.
CPC ...... *G06F 9/30185* (2013.01); *G06F 9/30018* (2013.01)

(58) Field of Classification Search
CPC ..................................................... G06F 17/10
See application file for complete search history.

(56) References Cited

U.S. PATENT DOCUMENTS

| | | |
|---|---|---|
| 5,704,052 A | 12/1997 | Wu et al. |
| 6,745,319 B1 | 6/2004 | Balmer et al. |
| 7,155,601 B2 | 12/2006 | Chennupaty et al. |
| 7,290,098 B2 | 10/2007 | Dagan et al. |
| 8,463,837 B2 * | 6/2013 | Chen ............ G06F 9/30014 708/603 |
| 2003/0105945 A1 | 6/2003 | Wolff et al. |
| 2004/0054877 A1 * | 3/2004 | Macy, Jr. ............ G06F 7/76 712/221 |
| 2004/0254966 A1 | 12/2004 | Sunwoo et al. |
| 2006/0101246 A1 | 5/2006 | Iwata |

(Continued)

FOREIGN PATENT DOCUMENTS

| | | |
|---|---|---|
| CN | 1278931 A | 1/2001 |
| WO | 0138974 A1 | 5/2001 |

OTHER PUBLICATIONS

International Search Report and Written Opinion correlating to PCT/IB2011/051353 dated Dec. 26, 2011.

(Continued)

*Primary Examiner* — Cheng-Yuan Tseng

(57) ABSTRACT

An integrated circuit device comprising at least one instruction processing module arranged to receive a bit-manipulation instruction, and in response to receiving the bit-manipulation instruction to select at least one bit from at least one source data register in accordance with a value of at least one control bit, select from candidate values a manipulation value for the at least one selected bit in accordance with a value of at least one further control bit, and store the selected manipulation value for the at least one selected bit in at least one output data register.

17 Claims, 4 Drawing Sheets

(56) References Cited

U.S. PATENT DOCUMENTS

2008/0077643 A1    3/2008   Handa
2009/0138534 A1    5/2009   Lee et al.
2010/0318771 A1   12/2010   Sudhakar et al.

OTHER PUBLICATIONS

Extended European Search Report for Application No. 11862190.3-1957, mailed May 8, 2015, 5 pages.

* cited by examiner

INTEGRATED CIRCUIT DEVICE AND METHODS OF PERFORMING BIT MANIPULATION THEREFOR

FIELD OF THE INVENTION

The field of this invention relates to an integrated circuit device, a method of performing bit manipulation, and a method of implementing bit manipulation therefor.

BACKGROUND OF THE INVENTION

Modern Digital Signal Processor (DSP) applications often perform bit shuffling operations and the like, in order to implement required data manipulation. For example, such a bit shuffling operation is used in order to implement bit interleaving operations in WIMAX (Worldwide Interoperability for Microwave Access) or WCDMA (Wideband Code Division Multiple Access). The DSP is arranged to execute the bit shuffling operation in response to receiving a bit shuffling instruction.

Dedicated instructions can be used to support specific algorithm implementations that are known and planned for during development of a DSP. However, such dedicated instructions are typically not able to support algorithms that subsequently become required to be implemented after the design phase of the DSP.

The implementation of general bit shuffling/bit manipulation instructions within DSPs is known, for example using butterfly bit shifting circuitry. However, the complexity of implementing such techniques in hardware is extremely high, thereby increasing the development cost and time for finalising the DSP design.

SUMMARY OF THE INVENTION

The present invention provides an integrated circuit device, a method of performing general bit manipulation, and a method of implementing general bit manipulation as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention will now be described with reference to an example of an instruction processing module, such as a central processing unit (CPU) or digital signal processing (DSP). However, it will be appreciated that the present invention is not limited to the specific instruction processing module herein described with reference to the accompanying drawings, and may equally be applied to alternative signal processing modules. For the illustrated example, an instruction processing module is provided comprising separate data and address registers. Alternatively, the address registers may be combined with the data registers, and the combined registers being used to provide address storage, etc. Furthermore, for the illustrated examples, the instruction processing module is shown as comprising four data execution units. However, it will be appreciated that examples of the present invention may be equally implemented within an instruction processing module comprising any other number of data execution units, e.g. one, two, eight, etc. Additionally, because the illustrated example embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
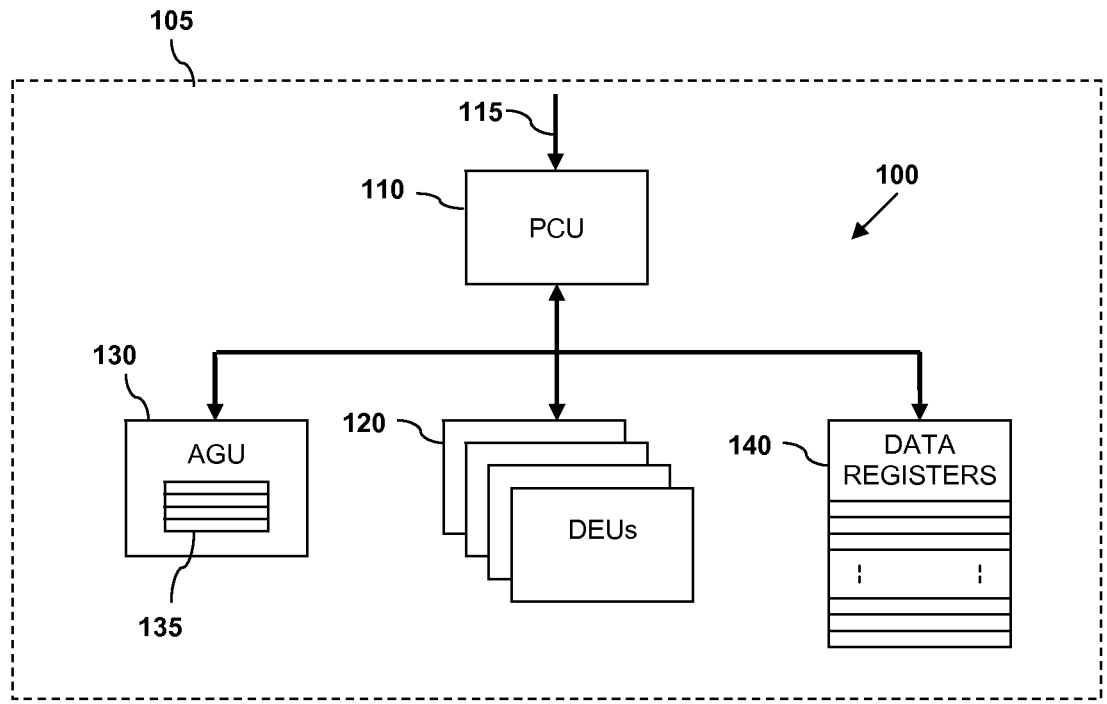
FIG. 1 shows a block diagram of an example of an integrated circuit device comprising an instruction processing module.

Referring first to FIG. 1, there is illustrated a simplified block diagram of an example of a part of an instruction processing module 100 in accordance with some example embodiments of the present invention. In the illustrated example, the instruction processing module 100 is a part of an integrated circuit device, illustrated generally at 105, and comprises at least one program control unit (PCU) 110, one or more data execution unit (DEU) modules 120, at least one address generation unit (AGU) 130 and a plurality of data registers, illustrated generally at 140. The PCU 110 is arranged to receive instructions, as illustrated generally at 115, and to cause an execution of operations within the instruction processing module 100 in accordance with the received instructions, such operations being performed by, say, one or more of the DEU modules 120. For example, the PCU 110 may receive an instruction, for example stored within an instruction buffer (not shown), where the received instruction requires one or more operations to be performed on one or more bits/bytes/words/etc., of data. A data 'bit' typically refers to a single unit of binary data comprising either a logic '1' or a logic '0', whilst a 'byte; typically refers to a block of 8-bits. A data 'word' may comprise one or more bytes of data, for example two bytes (16-bits) of data, depending upon the particular instruction processing module. Upon receipt of such an instruction, the PCU 110 generates and outputs instructions and/or control signals to the various other components within the instruction processing module 100, in order for the required operations to be performed. The AGU 130 is arranged to generate address values for accessing external system memory (not shown), and may comprise one or more address registers as illustrated generally at 135. The data registers 140 provide storage for data fetched from system memory, and on which one or more operations is/are to be performed, and from which data may be written to system memory. The DEU modules 120 are arranged to perform operations on data (either provided directly thereto or stored within the data registers 140) in accordance with instructions and control signals received from the PCU 110. As such, the DEU modules 120 may comprise arithmetic logic units (ALUs), etc.

As described in greater detail below, the instruction processing module 100 of the illustrated example is arranged to receive a bit-manipulation instruction, and in response to receiving the bit-manipulation instruction to select at least one bit from at least one source data register in accordance with at least one control bit, select from candidate values a manipulation value for the at least one selected bit in accordance with at least one further control bit, and store the selected manipulation value for the at least one selected bit in at least one output data register. In this manner, the instruction processing module 100 is able to perform flexible and configurable bit-manipulation of data within a source data register in a simple and efficient manner, and as demonstrated below, with a low cost of hardware area and complexity.

Figure 2:
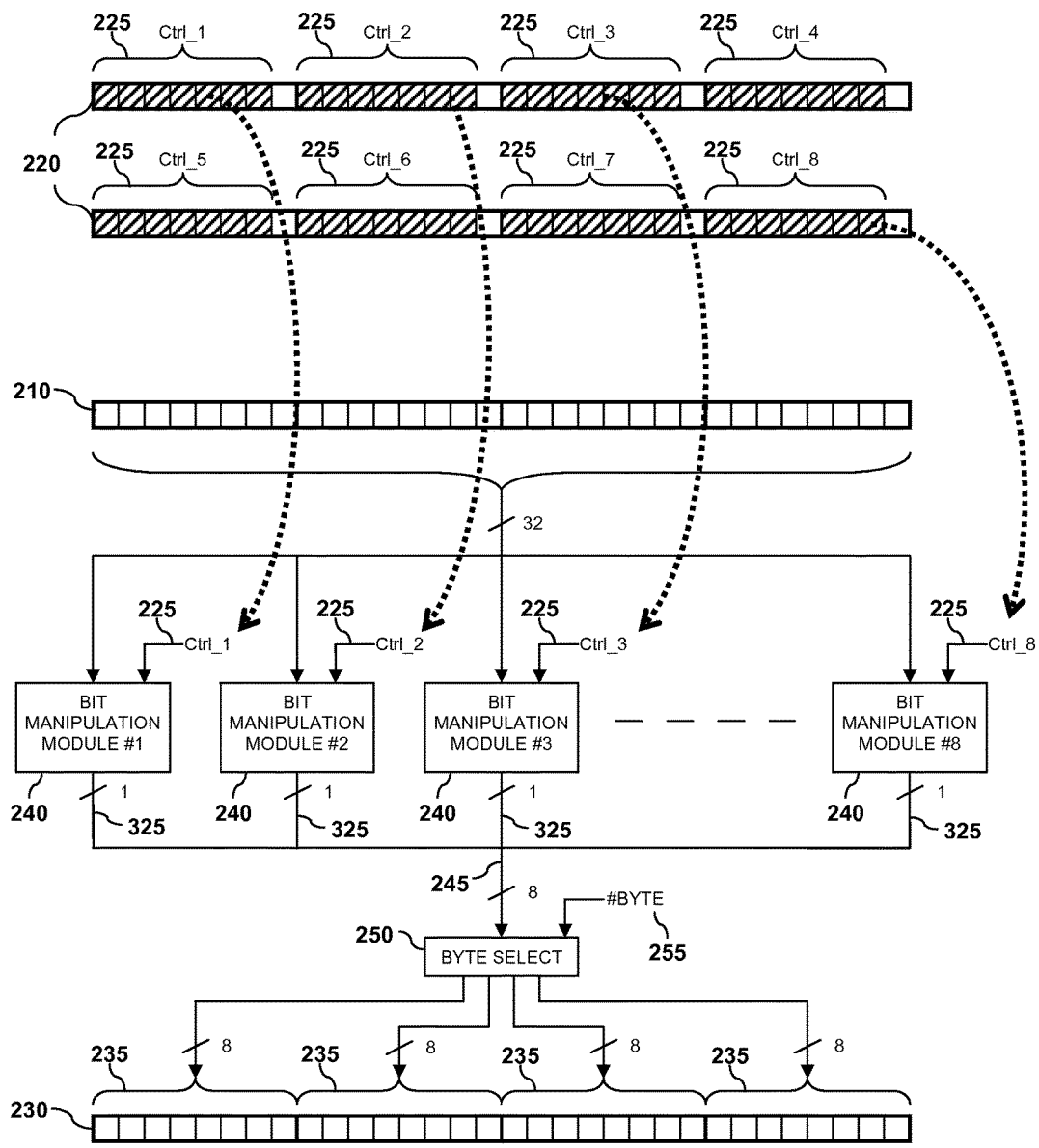
FIG. 2 shows a block diagram of an example of part a of an instruction processing module.

Referring to FIG. 2, there is illustrated an example of an execution of such a bit-manipulation instruction, such as may be implemented within, say, one or more of the DEU modules 120 of the instruction processing module 100 of FIG. 1. Data bits to be manipulated are loaded into one or more source data registers. For the illustrated example, data bits to be manipulated are loaded into a 32-bit source data register 210. It will be appreciated that alternative instruction processing modules may comprise data registers of different sizes, and accordingly the present invention is not limited to the use of 32-bit data registers. The instruction processing module 100 is arranged to, upon receipt of a bit-manipulation instruction, select at least one bit from the source data register 210 in accordance with the value of at least one control bit, and to select a manipulation value for the (at least one) selected bit in accordance with the value of at least one further control bit. For the example illustrated in FIG. 2, the instruction processing module 100 comprises one or more bit-manipulation modules 240 arranged to select data bits from the source data register 210 in accordance with the values of control bits Ctrl_1 to Ctrl_8 illustrated generally at 225, and to perform bit-manipulation operations on the selected data bits. The bit-manipulation operations can comprise selecting a manipulation value for each selected data bit in accordance with the value(s) of one or more further control bits (also illustrated generally at 225 for simplicity in FIG. 2). Specifically for the illustrated example, the instruction processing module 100 comprises eight bit-manipulation modules 240. Each bit-manipulation module 240 is arranged to select one data bit from the source data register 210 and perform a bit-manipulation operation on the selected data bit, comprising the selection of a manipulation value for the selected data, and to output the selected manipulation value.

Figure 3:
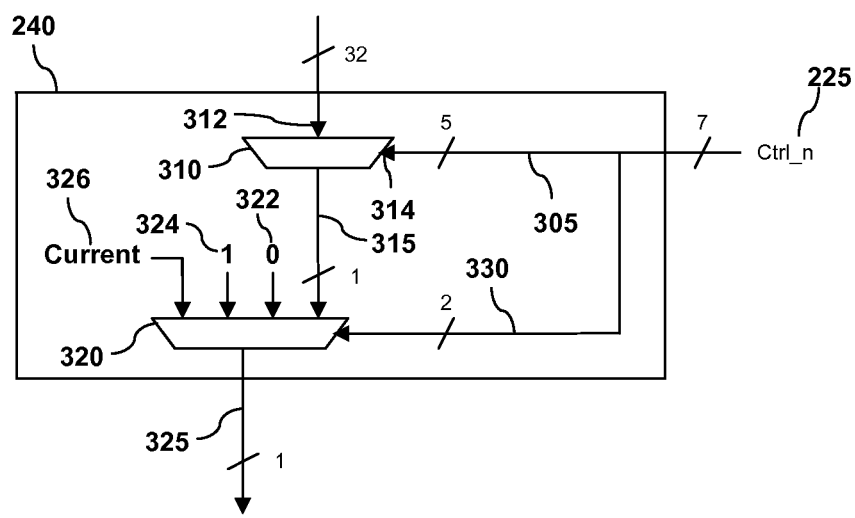
FIG. 3 shows a block diagram of an example of a bit-manipulation module.

FIG. 3 illustrates an example of a bit-manipulation module 240 in greater detail. The bit-manipulation module 240 for the illustrated example comprises a first multiplexer 310 arranged to receive at data inputs thereof (illustrated generally at 312) data bits stored within the source data register 210. For example, the data inputs 312 of the first multiplexer 310 may be operably coupled to the source data register 210 of FIG. 2, and thus be able to directly access the data bits stored therein. Alternatively, the data inputs 312 of the first multiplexer 310 may be operably coupled to a data manipulation buffer (not shown), and the instruction processing module 100 may be arranged to load the data bits stored in the source data register into the data manipulation buffer upon receipt of the data manipulation instruction. In the illustrated example, the data inputs 312 of the first multiplexer 310 are arranged to receive all, 32, bits of data stored within the 32-bit source data register 210. The first multiplexer 310 is further arranged to receive at a control input 314 thereof at least one control bit 305, and to selectively output one of the data bits received at its data inputs 312 in accordance with the value of the received control bit 305. For the illustrated example, in order for the first multiplexer 310 to select one data bit from the 32 received data bits, the first multiplexer 310 is arranged to receive five control bits 305, the values of the five control bits 305 defining a 5-bit binary value between (in decimal) 0 and 31; each of the 0 to 31 available values corresponding to one of the 32 received data bits.

The bit-manipulation module 240 in the illustrated example further comprises a second multiplexer 320 arranged to selectively output a manipulation value 325 for the bit 315 selectively output by the first multiplexer 310 in accordance with the value of at least one further control bit 330. For the illustrated example, the second multiplexer 320 is arranged to receive at data inputs thereof a candidate value comprising the bit 315 selectively output by the first multiplexer 310 and at least one further candidate manipulation value. The second multiplexer 320 is further arranged to receive at a control input thereof at least one control bit 330, and to selectively output one of either the bit 315 selectively output by the first multiplexer 310 or the at least one further manipulation value. For the illustrated example, the second multiplexer 310 is arranged to receive at data inputs thereof, in addition to the bit 315 selectively output by the first multiplexer 310, further candidate manipulation values comprising a bit value of '0' 322, a bit value of '1' 324, and a bit value of a target bit cell within an output data register (for example as described in greater detail below). Accordingly for the illustrated example, in order for the second multiplexer 320 to select one of the four received candidate manipulation values, the second multiplexer 320 is arranged to receive two control bits 330, the values of the two control bits 330 defining a 2-bit binary value between (in decimal) 0 and 3; each of the 0 to 3 available values corresponding to one of the four received candidate manipulation bits. The bit-manipulation module 240 then outputs the selected manipulation value 325 for the selected bit.

Referring back to FIG. 2, the selected manipulation values 325 for the selected bits 315 output by the bit-manipulation modules 240 are subsequently stored within one or more output data registers. For the illustrated example, the selected manipulation values 325 are stored within a 32-bit output data register 230, and it is contemplated that the selected manipulation values 325 may be stored by way of a partial 'write' operation at a location within the output data register 230 in accordance with an offset value. Specifically for the illustrated example, since the eight bit-manipulation modules 240 of the illustrated example outputs eight selected manipulation values 325 (i.e. one per bit-manipulation module 240), the eight selected manipulation values 325 may be arranged into a byte, as illustrated at 245, and stored at a location within the output data register 230 in accordance with a byte offset value, illustrated at 255. For the illustrated example, the instruction processing module 100 comprises a location selection module 250 arranged to receive the selected manipulation values 325 and the byte offset value 255, and to store the selected manipulation values 325 at a byte location 235 within the output data register 230 in accordance with the byte offset value 255. For example, in case the bit offset value indicates an offset of n bytes, the byte is stored in the $n^{th}$ byte position in the register 230.

Thus, for the illustrated example, manipulated data bits may be loaded into the output data register 340 one byte at a time, with the remaining bytes being left unchanged.

Accordingly, 32 bits may be manipulated and stored within the output data register 340 over, for the illustrated example, four executions of the bit manipulation instruction. Specifically, after four executions of such a bit manipulation, any bit to any bit mapping and manipulation of a full 32-bit register may be performed.

The ability to write a partial result to the output data register 340, whilst keeping the rest of the register unchanged as described above (e.g. to write eight manipulated bit values to the 32-bit output register for the illustrated example), provides additional flexibility to the instruction, thereby enabling consecutive blocks of manipulated data (e.g. bytes of data for the illustrated example) to be written to the output data register 340 in consecutive cycles. Without such an ability to write a partial result to the output data register 340, it would be necessary to write each result to a separate register and subsequently use additional instructions that merge the partial results to one register.

In accordance with some examples, the control bits 225 may be provided within one or more control data register, such as illustrated at 220 in FIG. 2. As shown in FIG. 3, in the illustrated example, the control bits 225 for each bit-manipulation module 240 comprise a first set of five control bits 305 for controlling the first multiplexer 310 thereof to selectively output a bit 315 from the source data register 210, and a further set of two control bits 330 for controlling the second multiplexer 320 thereof in order to selectively output a manipulation value 325 for the selected bit 315. Thus, for the illustrated example, each bit-manipulation module 240 is arranged to receive seven control bits 225. Accordingly, and as illustrated in FIG. 2, for the instruction processing module 100 of the illustrated example, the seven control bits 225 for each bit-manipulation module 240 may be stored within an eight-bit byte of the control data registers 220, thereby enabling the control bits 225 for all eight bit-manipulation modules 240 to be provided within two 32 bit control registers 220. In this manner, the selection, shuffling and manipulation of data bits from the source register 210 may be configured by simply setting the appropriate bit values within the control register(s) 220.

Below is an example of the syntax for a bit manipulation instruction as hereinbefore described:

BMANIP $D_{Src}$, $D_{Ctl1}$, $D_{Ctl2}$, #byte, $D_{Dst}$ where:

$D_{Src}$ identifies the source data register 210 within which the data to be manipulated is located;

$D_{Ctl1}$ and $D_{Ctl2}$ identify the control data registers 220 within which the control bits are located;

$D_{Dst}$ identifies the output data register into which the manipulated bit values are to be stored; and byte is the byte offset 255 identifying the specific byte within the output data register within which the manipulated bit values are to be stored.

Thus, in some examples, the instruction processing module 100 of the illustrated examples enables the implementation of a flexible and configurable bit manipulation instruction in a simple and effective manner. In particular, by enabling the selection of individual bits to be manipulated from any location within the source data register 210, any bit to any bit mapping is provided for, thereby allowing bit shuffling/interleaving operations etc. to be simply and efficiently programmed and executed. Furthermore, by enabling the selection of different candidate manipulation values for each selected bit, various bit manipulation operations may be performed, in isolation or in combination with bit shuffling/interleaving. Bit shuffling/manipulations operations that may be performed using the bit manipulation instruction hereinbefore described include, by way of example only, puncturing, duplication, repetition, interleaving, etc. In comparison to conventional implementations for performing various bit shuffling procedures using general instructions, a simple bit interleave operation or bit reverse operation conventionally requires 64 instruction cycles, as compared with 4 instruction cycles using the bit manipulation instruction hereinbefore described. Similarly, a 3-bit de-interleave operation conventionally requires 48 instruction cycles, and a bit to byte operation conventionally requires 16 instruction cycles to implement, whereas with the bit manipulation instruction hereinbefore described only three and one instruction cycle(s) respectively is/are required. Thus, a simple, efficient and substantially general bit shuffling/manipulation instruction is provided.

Furthermore, in the example illustrated in FIG. 3, the flexible and configurable bit shuffling/manipulation for data within a 32-bit source register may be implemented within hardware using only eight 32-1 bit multiplexers 310 followed by eight 4-1 bit multiplexers 320, thereby substantially alleviating the problem of high complexity of implementation for known techniques in hardware and their associated high development costs and time.

In the example illustrated in FIG. 3, the (at least one) instruction processing module 100 is arranged to select a manipulation value 325 for the (at least one) selected bit 315 from a group of bit 315 values, a bit value of '0', a bit value of '1', and a bit value of a target bit cell within the (at least one) output data register 230. Any alternative suitable selection of candidate manipulation values may be made available, for example a selection of, say, only the bit 315 value and a bit value of a target bit cell within the output data registers 230. With regard to the bit value of a target bit cell within the output data registers 230, such a target bit cell may comprise the corresponding bit cell into which the selected manipulation value 325 is to be stored (thus enabling the value of that bit cell to remain unchanged).

Figure 4:
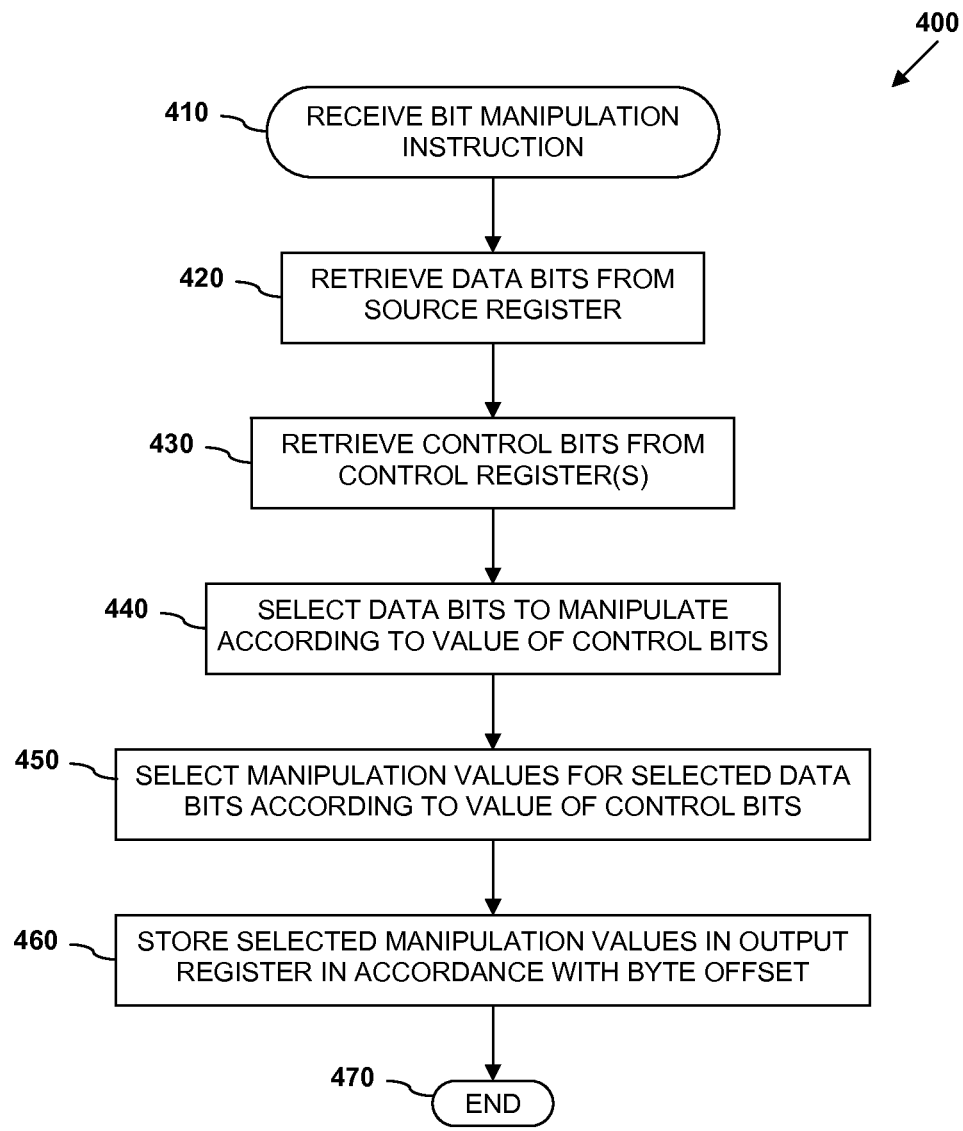
FIG. 4 shows a simplified flowchart of an example of a method of performing bit-manipulation.

Referring now to FIG. 4, there is illustrated a simplified flowchart 400 of an example of a method of performing bit-manipulation within an instruction processing module, such as may be implemented within the instruction processing module 100 of FIG. 1. The method starts at 410 with a receipt of a bit manipulation instruction, and moves on to 420 and 430 where, for the illustrated example, source data bits from one or more source data registers and control bits from one or more control registers are retrieved respectively. For example, the source and control bits may be loaded into respective buffers from where they may be accessed by, say, bit manipulation modules such as the bit manipulation modules illustrated in FIG. 2 and FIG. 3. Alternatively, the retrieval of the source and control data bits may simply comprise operably coupling such bit manipulation modules directly to the respective source and control registers in order for the bit manipulation modules to access the source and control bits directly therefrom.

For clarity, the retrieval of such source and control bits has been illustrated as two separate operations 420, 430 within the flowchart 400 of FIG. 4. However, in some examples, such retrieval of the source data bits may be equally performed substantially simultaneously to the retrieval of the control data bits, or in the reverse order to that illustrated in FIG. 4.

Next, at 440, one or more source data bits are selected from the source data register(s) in accordance with the value(s) of one or more of the control data bits. A manipulation value is then selected from candidate values for each of the selected source data bits in accordance with the value(s) of one or more further control data bits, at 450. For example, such a candidate value may comprise the value of the selected bit, a bit value of '0', a bit value of '1', or a bit value of a target bit cell within an output data register. The selected manipulation value(s) is/are then stored within an output data register in accordance within a location offset (e.g. byte offset) provided within, say, the received bit manipulation instruction, at 460. The method then ends at 470.

Figure 5:
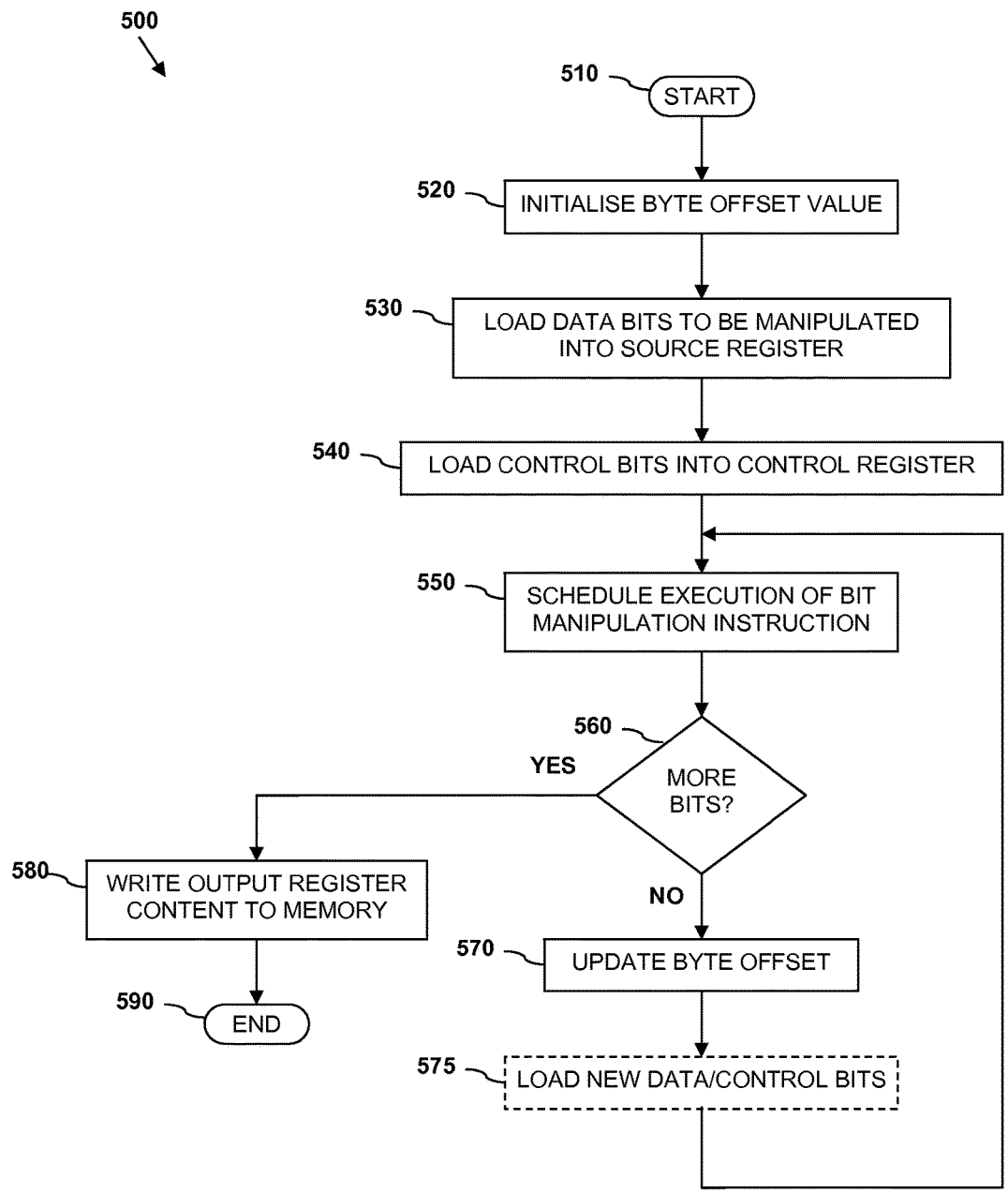
FIG. 5 shows a simplified flowchart of an example of a method of implementing bit-manipulation.

Moving on to FIG. 5, there is illustrated a simplified flowchart 500 of an example of implementing bit-manipulation within an instruction processing module, such as the instruction processing module 100 of FIG. 1. The method starts at 510, and moves on to 520, where a location offset value (which for the illustrated example comprises a byte offset value) is initialised. For example, the byte offset value may be initialised to indicate the first byte of a register to cause manipulation values to be stored within, say, a first byte of an output register. The method then moves on to 530 and 540 where, for the illustrated example, source data bits and control bits are each loaded into source and control registers respectively.

For clarity, the loading of such source and control bits into respective registers has been illustrated as two separate operations 530, 540 within the flowchart 500 of FIG. 5. However, in some examples, such loading of the source data bits into one or more source registers may be equally performed substantially simultaneously to the loading of the control data bits into one or more control registers, or in the reverse order to that illustrated in FIG. 5.

Having loaded the source and control bits into their respective registers, a bit manipulation instruction is then scheduled for execution at 550. If, at 560, more bits of data are required to be manipulated, the method moves on to 570 where the byte offset value is updated (e.g. incremented or decremented) to cause manipulation values to be stored within, say, the next byte of the output register. Optionally, new source and/or control bits may be loaded into their respective registers at 575. The method then loops back to 550 where a further bit manipulation instruction is then scheduled for execution. Conversely, if at 560 no further bits of data are required to be manipulated, the method moves on to 580 where the contents of the output register (within which the manipulated bit values have been stored) is written to, for example, system memory. The method then ends at 590.

Parts of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the bit manipulation modules 240 and the byte select module 250 of FIG. 2 have been illustrated and described as separate, substantially independent function logic blocks for clarity and ease of understanding. However, it will be appreciated that the functionality provided thereby may be distributed throughout any number and configuration of physical logic blocks.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
at least one instruction processing module arranged to receive a bit-manipulation instruction, the bit-manipulation instruction for enabling selection of single bits from a plurality of bits for manipulation, the single bits from any location of at least one source data register according to a plurality of sets of control bits from at least one control data register, each set of control bits from the plurality of sets of control bits corresponding to only a single bit to be manipulated, and in response to receiving the bit-manipulation instruction to select a single bit from the at least one source data register in accordance with a value of at least one control bit of the set of the control bits corresponding to the single bit, select from a group of candidate values comprising a value of the single selected bit, a bit value of '0', a bit value of '1', and a bit value of a target bit cell within the at least one output data register, a manipulation value for the single selected bit in accordance with a value of at least one further control bit of the set of control bits, and store the selected manipulation value for the single selected bit in at least one output data register.

2. The integrated circuit device of claim 1 wherein the at least one instruction processing module comprises at least one bit-manipulation module arranged to select the single bit from the at least one source data register in accordance with the value of the at least one control bit, select the manipulation value for the single selected bit in accordance with the value of the at least one further control bit, and output the selected manipulation value for the single selected bit, in response to the instruction processing module receiving the bit-manipulation instruction.

3. The integrated circuit device of claim 2 wherein the at least one bit-manipulation module comprises:
a first multiplexer arranged to selectively output the single bit from the at least one source data register in accordance with the value of the at least one control bit; and
a second multiplexer arranged to selectively output the selected manipulation value for the bit selectively output by the first multiplexer in accordance with the value of the at least one further control bit.

4. The integrated circuit device of claim 3 wherein the first multiplexer of the at least one bit-manipulation module is arranged to selectively output the single bit from a 32-bit source register in accordance with a 5-bit control signal.

5. The integrated circuit device of claim 1 wherein the values of the at least one control bit and the at least one further control bit are retrieved from a byte-sized portion of the at least one control data register.

6. The integrated circuit device of claim 1 wherein the at least one instruction processing module is arranged to store the selected manipulation value for the single selected bit at a location within the at least one output data register in accordance with an offset value.

7. The integrated circuit device of claim 6 wherein the at least one instruction processing module comprises at least one location selection module arranged to store the selected manipulation value for the single selected bit at a location within the at least one output data register in accordance with the offset value.

8. The integrated circuit device of claim 1 wherein the at least one instruction processing module comprises:
a plurality of eight bit-manipulation modules, a number of which are arranged to select the single bit from the at least one source data register in accordance with the value of the at least one control bit, select the manipulation value for the at least one selected bit in accordance with the value of the at least one further control bit, and output the selected manipulation value for the single selected bit, in response to the instruction processing module receiving a bit-manipulation instruction.

9. The integrated circuit device of claim 8 wherein the at least one instruction processing module further comprises:
a byte selection module arranged to store the eight selected manipulation values output by the eight bit-manipulation modules, and to store as a byte the manipulation values at a location within the at least one output data register in accordance with a byte offset value.

10. The integrated circuit device of claim 1 wherein the at least one instruction processing module is arranged to store the selected manipulation value for the single selected bit in at least one output data register by way of a partial write operation.

11. A method of performing bit-manipulation within an instruction processing module in response to receiving a bit-manipulation instruction, the bit-manipulation instruction for enabling selection of single bits from a plurality of bits for manipulation, the single bits from any location of at least one source data register according to a plurality of sets of control bits from at least one control data register, each set of control bits from the plurality of sets of control bits corresponding to only a single bit to be manipulated, the method comprising:
selecting a single bit from at least one source data register in accordance with a value of at least one control bit of the set of control bits corresponding to the single bit;
selecting from a group of candidate values comprising a value of the single selected bit, a bit value of '0', a bit value of '1', and a bit value of a target bit cell within the at least one output data register, a manipulation value for the single selected bit in accordance with a value of at least one further control bit of the set of control bits; and
storing the selected manipulation value for the single selected bit in at least one output data register.

12. The method of claim 11 wherein the method further comprises retrieving the values of the at least one control bit and the at least one further control bit from a byte-sized portion of the at least one control data register.

13. The method of claim 12 wherein the method further comprises storing the selected manipulation value for the single selected bit at a location within the at least one output data register in accordance with an offset value.

14. A method of implementing bit-manipulation within an instruction processing module, the method comprising:
loading data bits to be manipulated into at least one source data register; and
scheduling at least one bit-manipulation instruction to be executed by the instruction processing module, the at least one bit-manipulation instruction for enabling selection of single bits from a plurality of bits for manipulation, the single bits from any location of at least one source data register according to a plurality of sets of control bits from at least one control data register, each set of control bits from the plurality of sets of control bits corresponding to only a single bit to be manipulated,
wherein the at least one bit-manipulation instruction causes:
selecting a single bit from the at least one source data register in accordance with a value of at least one control bit of the set of control bits corresponding to the single bit;
selecting from a group of candidate values comprising a value of the single selected bit, a bit value of '0', a bit value of '1', and a bit value of a target bit cell within the at least one output data register, a manipulation value for the single selected bit in accordance with a value of at least one further control bit of the set of control bits; and
storing the selected manipulation value for the single selected bit in at least one output data register.

15. The method of claim 14 wherein the method further comprises loading the values of the control bits into at least one control data register.

16. The method of claim 11 wherein the method further comprises retrieving the values of the at least one control bit and the at least one further control bit from a byte-sized portion of the at least one control data register.

17. The integrated circuit device of claim 2 wherein the values of the at least one control bit and the at least one further control bit are retrieved from at least one control data register.

* * * * *